(12) United States Patent
Ko

(10) Patent No.: US 8,866,424 B2
(45) Date of Patent: Oct. 21, 2014

(54) MOTOR DRIVING DEVICE

(75) Inventor: Joo Yul Ko, Gyeonggi-do (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 247 days.

(21) Appl. No.: 13/410,172

(22) Filed: Mar. 1, 2012

(65) Prior Publication Data

US 2013/0082629 A1 Apr. 4, 2013

(30) Foreign Application Priority Data

Sep. 30, 2011 (KR) .......................... 10-2011-0099538

(51) Int. Cl.
*H02P 6/10* (2006.01)

(52) U.S. Cl.
CPC ............... *H02P 6/10* (2013.01); *Y02B 70/1491* (2013.01)
USPC .................. 318/400.23; 318/400.01; 318/700

(58) Field of Classification Search
CPC .............................. H02M 1/44; Y02B 70/1491
USPC ................................ 318/400.23, 400.01, 700
See application file for complete search history.

(56) References Cited

U.S. PATENT DOCUMENTS

| 5,898,288 A * | 4/1999 | Rice et al. ...................... 318/685 |
| 7,609,015 B2 * | 10/2009 | Okui ......................... 318/400.21 |
| 8,044,617 B2 * | 10/2011 | Lee ................................ 318/380 |
| 8,461,795 B2 * | 6/2013 | Ando et al. .................... 318/696 |

FOREIGN PATENT DOCUMENTS

KR 10-2009-0045142 A 5/2009

* cited by examiner

*Primary Examiner* — David Luo
(74) *Attorney, Agent, or Firm* — Bracewell & Giuliani LLP; Brad Y. Chin

(57) ABSTRACT

Provided is a motor driving device. The motor driving device includes a drive signal generating unit, a current control unit, and a driving unit. The drive signal generating unit generates a motor drive signal for driving a motor. The current control unit is disposed at a front of the drive signal generating unit and controls a current of the drive signal generating unit so as to prevent noise and vibration of a motor caused by electromagnetic interference generated when a switch of the drive signal generating unit is turned on/off. The driving unit drives the motor based on the motor drive signal outputted from the drive signal generating unit.

14 Claims, 5 Drawing Sheets

MOTOR DRIVING DEVICE

CROSS-REFERENCE TO RELATED APPLICATIONS

This application claims the benefit of Korean Patent Application No. 10-2011-0099538 filed with the Korea Intellectual Property Office on Sep. 30, 2011, the disclosure of which is incorporated herein by reference.

BACKGROUND OF THE INVENTION

1. Field of the Invention

The present invention relates to a motor driving device, and more particularly, to a motor driving device that can reduce noise.

2. Description of the Related Art

Brushless Direct-Current (DC) motors use a permanent magnet instead of a rotor of a typical DC motor and use an excitation phase control method instead of a speed control method of a typical DC motor.

Since the brushless DC motors do not use a mechanical contact part such as a brush and a commutator of a typical DC motor, they are called commutatorless DC motors or brushless DC motors. Since the brushless DC motors have the advantages of low failure rate, simple motor structure, small size, and fast response characteristics, they are being used as actuators in various fields.

However, the performance of the brushless DC motors may be degraded due to the noise or vibration of the motor caused by Electromagnetic Interference (EMI) that may be generated when a switch is turned on/off during a pull-up operation.

SUMMARY OF THE INVENTION

The present invention has been invented in order to overcome the above-described problems and it is, therefore, an object of the present invention to provide a motor driving device that can improve the performance of a motor.

In accordance with one aspect of the present invention to achieve the object, there is provided a motor driving device including: a drive signal generating unit configured to generate a motor drive signal for driving a motor; a current control unit disposed at a front of the drive signal generating unit and configured to control a current of the drive signal generating unit so as to prevent noise and vibration of a motor caused by electromagnetic interference generated when a switch of the drive signal generating unit is turned on/off; and a driving unit configured to drive the motor based on the motor drive signal outputted from the drive signal generating unit.

In accordance with another aspect of the present invention to achieve the object, there is provided a motor driving device, which includes: a drive signal generating unit configured to generate a motor drive signal for driving a motor; a comparing unit configured to generate a comparison signal by comparing a voltage of the drive signal generating unit with a reference signal; a switching unit configured to receive the comparison signal to control an amount of current supplied to the drive signal generating unit; and a driving unit configured to drive the motor based on the motor drive signal outputted from the drive signal generating unit.

In accordance with another aspect of the present invention to achieve the object, there is provided a motor driving device, which includes: a drive signal generating unit configured to generate a motor drive signal for driving a motor; a comparing unit configured to generate a comparison signal by comparing a voltage of the drive signal generating unit with a reference signal; a switching unit configured to receive the comparison signal to control an amount of current supplied to the drive signal generating unit; a charging unit disposed at an output terminal of the switching unit and configured to charge and discharge a voltage; and a driving unit configured to drive the motor based on the motor drive signal outputted from the drive signal generating unit.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Hereinafter, specific embodiments of the present invention will be described in detail with reference to the accompanying drawings. However, the present invention is provided for the illustrative purpose only but not limited thereto.

The objects, features, and advantages of the present invention will be apparent from the following detailed description of embodiments of the invention with references to the following drawings. Descriptions of well-known components and processing techniques are omitted so as not to unnecessarily obscure the embodiments of the present invention. The following terms are defined in consideration of functions of the present invention and may be changed according to users or operator's intentions or customs. Thus, the terms shall be defined based on the contents described throughout the specification.

This invention may be embodied in different forms and should not be construed as limited to the embodiments set forth herein. Rather, these embodiments are provided so that this disclosure will be thorough and complete, and will fully convey the scope of the invention to those skilled in the art.

Figure 1:
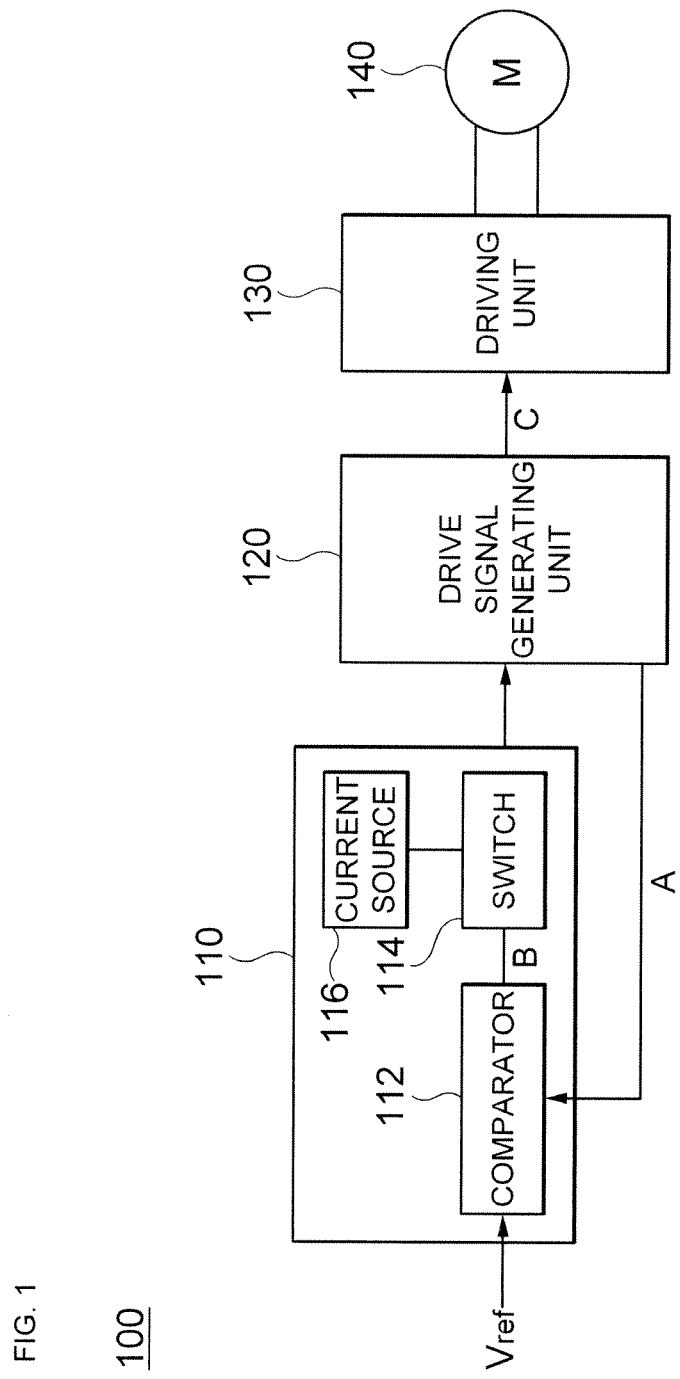
FIG. 1 is a block diagram of a motor driving device in accordance with a first embodiment of the present invention.
Figure 2:
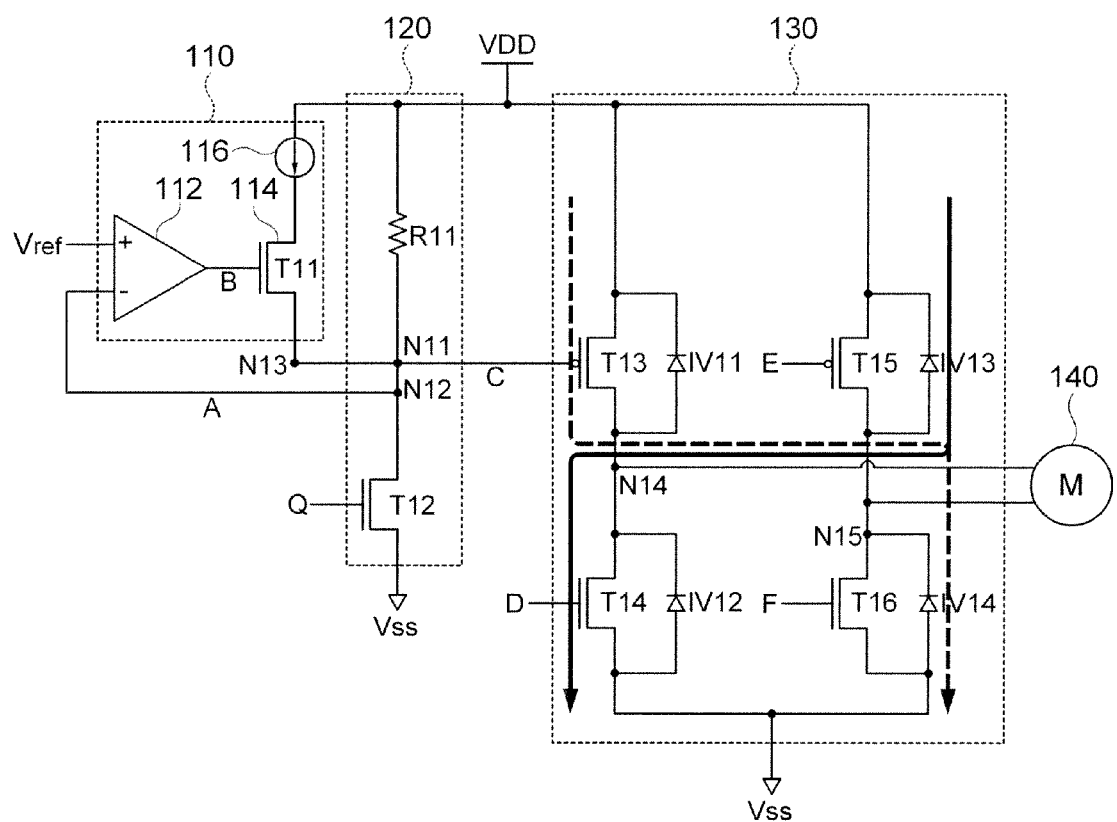
FIG. 2 is a detailed circuit diagram of a motor driving device in accordance with a first embodiment of the present invention.

FIG. 1 is a block diagram of a motor driving device in accordance with a first embodiment of the present invention. FIG. 2 is a detailed circuit diagram of a motor driving device in accordance with a first embodiment of the present invention.

Referring to FIGS. 1 and 2, a motor driving device 100 includes a current control unit 110, a drive signal generating unit 120, and a driving unit 130.

The current control unit 110 controls a current of the drive signal generating unit 120 so as to prevent the noise or vibration of a motor caused by Electromagnetic Interference (EMI) generated when a switch of the drive signal generating unit 120 is turned on/off.

The current control unit 110 may include a comparator 112, a switch 114, and a current source 116.

The comparator 112 may generate a comparison signal B by comparing a sense voltage A sensed by a second node N12 of the drive signal generating unit 120 with a reference voltage Vref. In this case, the comparator 112 may be configured using a typical comparator, or may be configured using a differential amplifier or a converter; however, the invention is not limited thereto.

The comparator 112 may generate a comparison signal B of a low level when the sense voltage A sensed from the drive signal generating unit 120 is lower than the reference voltage Vref.

On the other hand, the comparator 112 may generate a comparison signal B of a high level when the sense voltage A sensed from the drive signal generating unit 120 is higher than the reference voltage Vref.

The switch 114 may determine the potential of a first node N11 based on the level of the comparison signal B outputted from the comparator 112. In this case, the switch 114 may be a PMOS transistor.

More specifically, when a comparison signal of a high level is inputted from the comparator 112, the switch 114 is turned on, and thus the potential of the first node N11 is guided into a potential provided from the current source 116, thereby reducing noise caused by a switch T12 of the drive signal generating unit 120.

On the other hand, when a comparison signal B of a low level is inputted from the comparator 112, the switch 114 is turned off.

In this case, the current source 116 may be disposed at one end (source of the switch 114) of the switch 114 to provide a current.

Thus, the current control unit 110 may receive a voltage of the drain of a switch disposed in the drive signal generating unit 120, and may compare the voltage with the reference voltage Vref to determine presence or absence of noise during the pull-up operation, thereby improving the performance of the motor driving device.

The drive signal generating unit 120 may generate a drive signal C for driving a motor 140 under the control of the current control unit 110.

The drive signal generating unit 120 may prevent the level of the first node N11 from fluctuating, by allowing a voltage drop to occur by a pull-up resistor of the drive signal generating unit 120 even when a pulse form of input voltage Q is inputted into a switch (NMOS transistor of FIG. 2) to generate a current.

In this case, the pulse form of input voltage is a voltage determined by a hall signal, an external device, and a counter electromotive force.

As shown in FIG. 2, the drive signal generating unit 120 may include a resistor R11 and an NMOS transistor T12. The potential of the first node N11 disposed between the resistor R11 and the NMOS transistor T12 may be determined by the current control unit 110.

The drive signal generating unit 120 may drive the driving unit 130 in accordance with the potential of the first node N11 determined by the control of the current control unit 110.

The driving unit 130 may be connected to a terminal of the vibration motor 140 that is a drive target, and may be a switching circuit that controls power supplied to a coil of the motor 140 in accordance with turn-on/off of internal transistors T13 to T16.

The driving unit 130 includes a first high-side transistor T13, a second high-side transistor T15, a first low-side transistor T14, and a second low-side transistor T16. The driving unit 130 corresponds to the output terminal for driving the vibration motor 140.

The first high-side transistor T13 and the first low-side transistor T14 are connected in series between VDD and VSS. Similarly, the second high-side transistor T15 and the second low-side transistor T16 are connected in series between VDD and VSS. In this embodiment, the first high-side transistor T13 and the second high-side transistor T15 are P-channel MOSFETs. Also, the first low-side transistor T14 and the second low-side transistor T16 are N-channel MOSFETs. These transistors may be N-channel MOSFETs or bipolar transistors.

A first switching voltage N14 on a contact between the first high-side transistor T13 and the first low-side transistor T14 is applied to a first terminal of the vibration motor 140.

On/off states of the first high-side transistor T13 and the first low-side transistor T14 are controlled by a first high-side drive signal C and a first low-side drive signal D that are applied to the gates of each transistor. When the first high-side transistor T13 is turned on, the first switching voltage N14 becomes VDD, and when the first low-side transistor T14 is turned on, the first switching voltage N14 becomes VSS.

Similarly, a second switching voltage N15 on a contact between the second high-side transistor T15 and the second low-side transistor T16 is applied to a second terminal of the vibration motor 140. On/off states of the second high-side transistor T15 and the second low-side transistor T16 are controlled by a second high-side drive signal E and a second low-side drive signal F.

In this case, the first high-side drive signal C may be determined by the drive signal generating unit 120, and the second high-side drive signal E, and the first and second low-side drive signals D and F may be determined by a hall signal, an external device, and a counter electromotive force.

Thus, the motor driving device 100 may enable soft-switching of the switch T12 disposed in the drive signal generating unit 120 during the pull-up operation by including the current control unit 110.

In the motor driving device 100, when a voltage is applied to a switch T12 in the drive signal generating unit 120 to allow the voltage of the drain of the switch T12, i.e., the voltage of a second node N12 to be lower than a reference voltage, the voltage of the first node N11 can be controlled by the comparator 112 of the current control unit 110. Accordingly, noise that may be generated by a switch T12 may be reduced.

Figure 3:
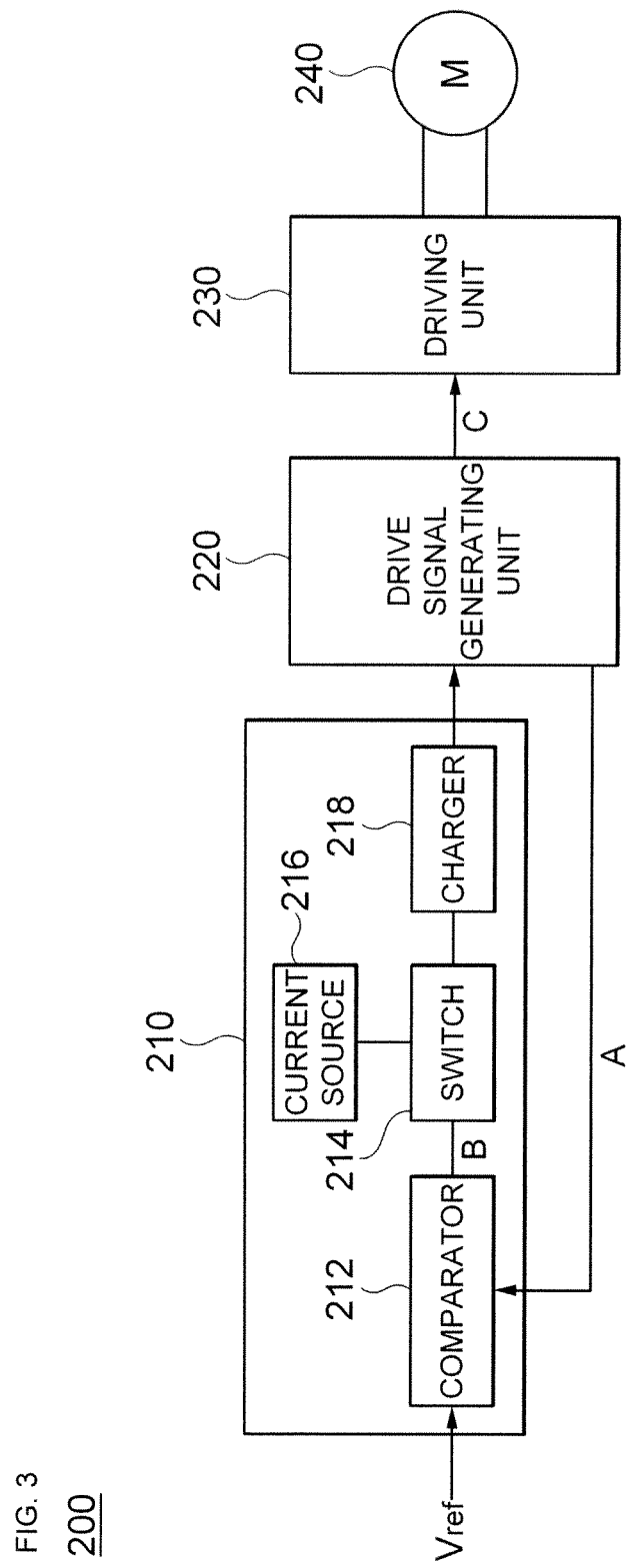
FIG. 3 is a block diagram of a motor driving device in accordance with a second embodiment of the present invention.
Figure 4:
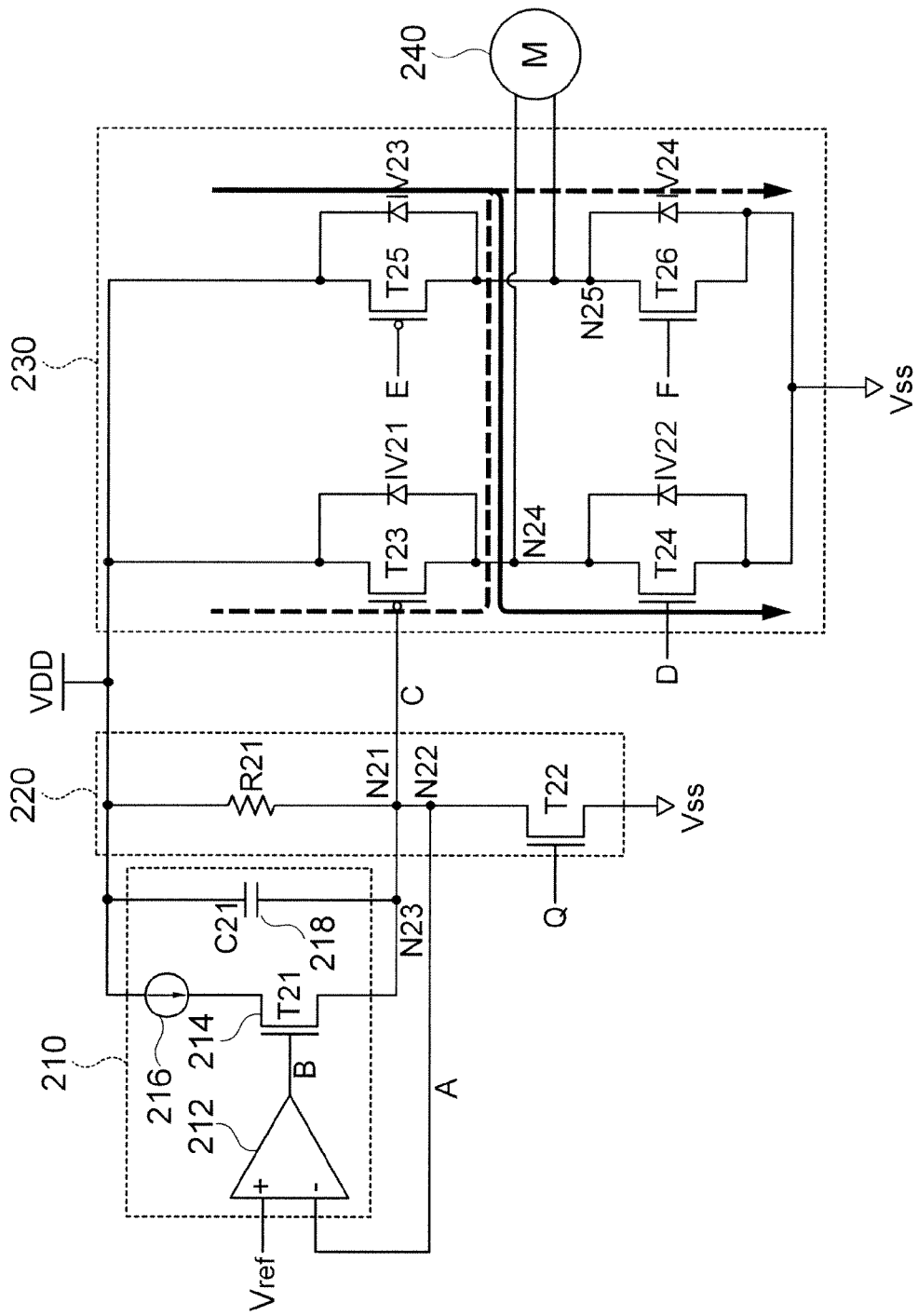
FIG. 4 is a detailed circuit diagram of a motor driving device in accordance with a second embodiment of the present invention.

FIG. 3 is a block diagram of a motor driving device in accordance with a second embodiment of the present invention. FIG. 4 is a detailed circuit diagram of a motor driving device in accordance with a second embodiment of the present invention.

Referring to FIGS. 3 and 4, a motor driving device 200 includes a current control unit 210, a drive signal generating unit 220, and a driving unit 230.

The current control unit 210 controls a current of the drive signal generating unit 220 so as to prevent noise or vibration of a motor caused by Electromagnetic Interference (EMI) generated when a switch of the drive signal generating unit 220 is turned on/off.

The current control unit 210 may include a comparator 212, a switch 214, a current source 216, and a charger 218.

The comparator 212 may generate a comparison signal B of a low level when a sense voltage A sensed from the drive signal generating unit 220 is lower than a reference voltage Vref.

On the other hand, the comparator 212 may generate a comparison signal B of a high level when the sense voltage A sensed from the drive signal generating unit 220 is higher than the reference voltage Vref.

The switch 214 may determine the potential of a first node N21 based on the level of the comparison signal B outputted from the comparator 212. In this case, the switch 214 may be an NMOS transistor.

More specifically, when a comparison signal of a high level is inputted from the comparator 212, the switch 214 is turned on, and thus the potential of the first node N21 is guided into a potential provided from the current source 216, thereby reducing noise caused by a switch T22 of the drive signal generating unit 220.

On the other hand, when a comparison signal B of a low level is inputted from the comparator 212, the switch 214 is turned off.

In this case, the current source 216 may be disposed at one end (source of the switch 214) of the switch 214 to provide a current.

When the potential of the first node N21 is 0, the charger 218 is charged by a capacitor C, and thus the potential of the first node N21 increases in accordance with the time constant that is the product of a resistance (R21 of FIG. 3) and the capacitance C.

After the lapse of a certain time, if the potential of the first node N21 rises beyond a predetermined voltage, that is, the potential of the first node N21 reaches a threshold voltage of a first high-side transistor T23, the potential of the first node N21 may be discharged.

Specifically, the charger 218 may raise an output level such that the output level is approximated to a straight line when the potential of the first node N21 is smaller than the threshold voltage of the first high-side transistor T23 compared with the reference voltage Vref, and may discharge the first node 21 to allow the level of an oscillation signal Vout to be 0 when the potential of the first node N21 is higher than the threshold voltage of the first high-side transistor T23.

Thus, the current control unit 210 may receive a voltage of the drain of a switch disposed in the drive signal generating unit 220, and may compare the voltage with the reference voltage Vref to determine presence or absence of noise during the pull-up operation, thereby improving the performance of the motor driving device.

The drive signal generating unit 220 may generate a drive signal C for driving a motor 240 under the control of the current control unit 210.

The drive signal generating unit 220 may prevent the level of the first node N21 from fluctuating, by allowing a voltage drop to occur by a pull-up resistor of the drive signal generating unit 220 even when a pulse form of input voltage Q is inputted into a switch (NMOS transistor of FIG. 4) to generate a current.

In this case, the pulse form of input voltage is a voltage determined by a hall signal, an external device, and a counter electromotive force.

As shown in FIG. 4, the drive signal generating unit 220 may include a resistor R21 and an NMOS transistor T22. The potential of the first node N21 disposed between the resistor R21 and the NMOS transistor T22 may be determined by the current control unit 210.

The drive signal generating unit 220 may drive the driving unit 230 in accordance with the potential of the first node N21 determined by the control of the current control unit 210.

The driving unit 230 may be connected to a terminal of the vibration motor 240 that is a drive target, and may be a switching circuit that controls power supplied to a coil of the motor 240 in accordance with turn-on/off of internal transistors T23 to T26.

The driving unit 230 includes a first high-side transistor T23, a second high-side transistor T25, a first low-side transistor T24, and a second low-side transistor T26. The driving unit 230 corresponds to the output terminal for driving the vibration motor 240.

The first high-side transistor T23 and the first low-side transistor T24 are connected in series between VDD and VSS. Similarly, the second high-side transistor T25 and the second low-side transistor T26 are connected in series between VDD and VSS. In this embodiment, the first high-side transistor T23 and the second high-side transistor T25 are P-channel MOSFETs. Also, the first low-side transistor T24 and the second low-side transistor T26 are N-channel MOSFETs. These transistors may be N-channel MOSFETs or bipolar transistors.

A first switching voltage N24 on a contact between the first high-side transistor T23 and the first low-side transistor T24 is applied to a first terminal of the vibration motor 240.

On/off states of the first high-side transistor T23 and the first low-side transistor T24 are controlled by a first high-side drive signal C and a first low-side drive signal D that are applied to the gate of each transistor. When the first high-side transistor T23 is turned on, the first switching voltage N24 becomes VDD, and when the first low-side transistor T24 is turned on, the first switching voltage N24 becomes VSS.

Similarly, a second switching voltage N25 on a contact between the second high-side transistor T25 and the second low-side transistor T26 is applied to a second terminal of the vibration motor 240. On/off states of the second high-side transistor T25 and the second low-side transistor T26 are controlled by a second high-side drive signal E and a second low-side drive signal F.

In this case, the first high-side drive signal C may be determined by the drive signal generating unit 220, and the second high-side drive signal E, and the first and second low-side drive signals D and F may be determined by a hall signal, an external device, and a counter electromotive force.

Thus, the motor driving device 200 may include the current control unit 210 to enable soft-switching of the switch T22 disposed in the drive signal generating unit 220 during the pull-up operation.

In the motor driving device 200, when a voltage is applied to a switch T22 in the drive signal generating unit 220 to allow the voltage of the drain of the switch T22, i.e., the voltage of a second node N22 to be lower than a reference voltage, the voltage of the first node N21 can be controlled by the comparator 212 of the current control unit 210. Accordingly, noise that may be generated by a switch T22 may be reduced.

Figure 5:
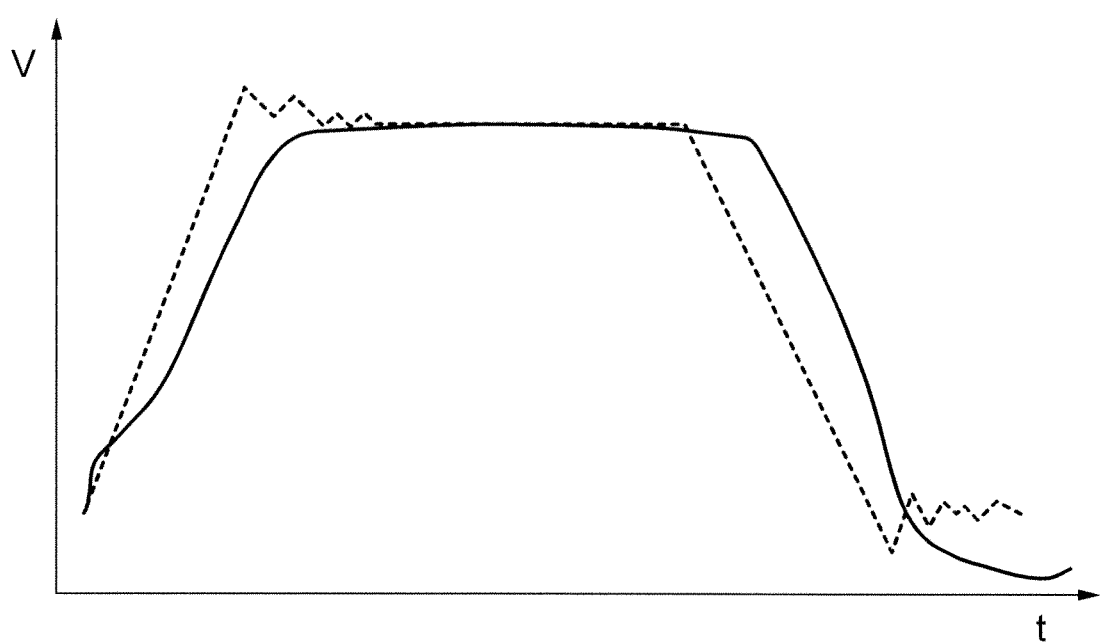
FIG. 5 is a graph showing an operation of a switch disposed in a drive signal generating unit of a motor driving device in accordance with an embodiment of the present invention.

FIG. 5 is a graph showing an operation of a switch disposed in a drive signal generating unit of a motor driving device in accordance with an embodiment of the present invention. Here, the horizontal axis of the graph indicates time T, and the vertical axis indicates voltage V.

As shown in FIG. 5, since damping of a switching voltage of the switch T22 is reduced by the current control unit, electromagnetic waves can be reduced.

Specifically, when the switch T22 is implemented with a hard switch, settling may occur due to high-frequency components, as indicated by a dotted line of FIG. 5. However, when the switch T22 according to an embodiment of the present invention is used, settling can be reduced by the current control unit, as indicated by a solid line of FIG. 5.

A motor driving device according to an embodiment of the present invention enables soft-switching of a switch disposed in a drive signal generating unit during pull-up operation using a current control unit disposed therein.

In addition, when a voltage is applied to a switch in the drive signal generating unit to allow the voltage of the drain of the switch, i.e., the voltage of a second node to be lower than a reference voltage, the voltage of a first node can be controlled by a comparator of the current control unit. Accordingly, the motor driving device can reduce noise that may be generated by a switch.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A motor driving device, which comprises:
   a drive signal generating unit configured to generate a motor drive signal for driving a motor;
   a current control unit disposed at a front of the drive signal generating unit and configured to control a current of the drive signal generating unit so as to prevent noise and vibration of a motor caused by electromagnetic interference generated when a switch of the drive signal generating unit is turned on/off; and
   a driving unit configured to drive the motor based on the motor drive signal outputted from the drive signal generating unit,
   wherein the drive signal generating unit comprises a resistor and a transistor that are connected in series, and
   wherein the current control unit comprises:
   a comparator configured to generate a comparison signal by comparing a sense voltage of the drive signal generating unit sensed by a node disposed between the resistor and the transistor with a predetermined reference voltage; and
   a switch configured to be switched based on the comparison signal outputted from the comparator.

2. The motor driving device according to claim 1, wherein the current control unit comprises a current source disposed at one end of the switch.

3. The motor driving device according to claim 2, wherein the switch is configured to be turned on when the comparison signal of a first level is inputted from the comparator to change a potential of the node into a potential provided from the current source.

4. The motor driving device according to claim 2, wherein the switch is configured to be turned off when a comparison signal of a second level is inputted from the comparator.

5. A motor driving device, which comprises:
   a drive signal generating unit configured to generate a motor drive signal for driving a motor;
   a comparing unit configured to generate a comparison signal by comparing a voltage of the drive signal generating unit with a reference signal;
   a switching unit configured to receive the comparison signal to control an amount of current supplied to the drive signal generating unit; and
   a driving unit configured to drive the motor based on the motor drive signal outputted from the drive signal generating unit,
   wherein the drive signal generating comprises a resistor and a transistor that are connected in series, and
   wherein the comparing unit is configured to sense the sense voltage by a node disposed between the resistor and the transistor.

6. The motor driving device according to claim 5, wherein the switching unit is configured to determine a level of the motor drive signal.

7. The motor driving device according to claim 5, which further comprises a current source at one end of the switching unit.

8. The motor driving device according to claim 7, wherein the switching unit is configured to be turned on when the comparison signal of a first level is inputted from the comparing unit to change a potential of the node into a potential provided from the current source.

9. The motor driving device according to claim 8, wherein the switching unit is configured to be turned off when the comparison signal of a second level is inputted from the comparing unit.

10. A motor driving device, which comprises:
    a drive signal generating unit configured to generate a motor drive signal for driving a motor;
    a comparing unit configured to generate a comparison signal by comparing a voltage of the drive signal generating unit with a reference signal;
    a switching unit configured to receive the comparison signal to control an amount of current supplied to the drive signal generating unit;
    a charging unit disposed at an output terminal of the switching unit and configured to charge and discharge a voltage; and
    a driving unit configured to drive the motor based on the motor drive signal outputted from the drive signal generating unit,
    wherein the drive signal generating comprises a resistor and a transistor that are connected in series, and
    wherein the comparing unit is configured to sense the sense voltage by a node disposed between the resistor and the transistor.

11. The motor driving device according to claim 10, wherein the switching unit is configured to determine a level of the motor drive signal.

12. The motor driving device according to claim 10, which further comprises a current source at one end of the switching unit.

13. The motor driving device according to claim 12, wherein the switching unit is configured to be turned on when the comparison signal of a first level is inputted from the comparing unit to change a potential of the node into a potential provided from the current source.

14. The motor driving device according to claim 13, wherein the switching unit is configured to be turned off when the comparison signal of a second level is inputted from the comparing unit.

* * * * *